(12) United States Patent
Rezk et al.

(10) Patent No.: US 11,841,430 B2
(45) Date of Patent: *Dec. 12, 2023

(54) TECHNIQUES FOR RANGE AND VELOCITY MEASUREMENTS IN A NON-DEGENERATE LIDAR SYSTEM

(71) Applicant: AEVA, INC., Mountain View, CA (US)

(72) Inventors: Mina Rezk, Haymarket, VA (US); Neal Oza, Palo Alto, CA (US)

(73) Assignee: Aeva, Inc., Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/576,498

(22) Filed: Jan. 14, 2022

(65) Prior Publication Data

US 2022/0137216 A1 May 5, 2022

Related U.S. Application Data

(63) Continuation of application No. 16/262,049, filed on Jan. 30, 2019, now Pat. No. 11,231,500.

(60) Provisional application No. 62/623,865, filed on Jan. 30, 2018.

(51) Int. Cl.
*G01S 17/26* (2020.01)
*G01S 17/58* (2006.01)

(52) U.S. Cl.
CPC .............. *G01S 17/26* (2020.01); *G01S 17/58* (2013.01)

(58) Field of Classification Search
None
See application file for complete search history.

(56) References Cited

U.S. PATENT DOCUMENTS

| | | | |
|---|---|---|---|
| 9,784,560 | B2 | 10/2017 | Thorpe et al. |
| 10,355,446 | B1 | 7/2019 | Ensher et al. |
| 2009/0087186 | A1 | 4/2009 | Holman et al. |
| 2011/0228249 | A1 | 9/2011 | Koehler et al. |
| 2013/0044311 | A1 | 2/2013 | Rakuljic |
| 2015/0198433 | A1 | 7/2015 | Saint Clair et al. |
| 2019/0383907 | A1 | 12/2019 | Belsey et al. |
| 2020/0241139 | A1 | 7/2020 | Roos et al. |

*Primary Examiner* — Hovhannes Baghdasaryan
(74) *Attorney, Agent, or Firm* — Womble Bond Dickinson (US) LLP

(57) ABSTRACT

A light detection and ranging (LIDAR) system is provided that includes a first optical source and a second optical source configured to emit respectively a first optical beam and a second optical beam that are nondegenerate and are chirped antiphase and at least one tap configured to split each of the first optical beam and the second optical beam to generate a first local oscillator and a second local oscillator. The LIDAR system further includes lensing optics to direct the first and second optical beams toward a target and collect reflected light from the first optical beam and second optical beam incident upon the target into a return path, the reflected light being collected into a return optical beam comprising a first return signal and a second return signal, and a first optical detector and a second optical detector configured to detect a first beat frequency generated from by mixing the first return signal with the first local oscillator and a second beat frequency generated from mixing the second return signal with the second local oscillator.

20 Claims, 9 Drawing Sheets

TECHNIQUES FOR RANGE AND VELOCITY MEASUREMENTS IN A NON-DEGENERATE LIDAR SYSTEM

CROSS-REFERENCE TO RELATED APPLICATION(S)

This application is a continuation of U.S. patent application Ser. No. 16/262,049, filed Jan. 30, 2019, which claims priority to U.S. Provisional Patent Application No. 62/623,865, filed Jan. 30, 2018, the entire content of which are incorporated herein by reference in its entirety.

TECHNOLOGICAL FIELD

The present disclosure relates generally to traditional light detection and ranging (LiDAR) and, in particular, to multiple-wavelength chirped LiDAR that provides simultaneous measurement of range and velocity across two dimensions.

BACKGROUND

Most traditional LiDAR systems are pulsed based and use direct time-of-flight (TOF) detection. In other words, they calculate range by precisely measuring the duration between the emission of an optical pulse and the detection of that same optical pulse. Their reliance on TOF detection fundamentally means they cannot measure the range and velocity of an object simultaneously. Moreover, direct detection of the pulses cannot distinguish between those pulses generated by one unit from other pulses generated by a different unit. This undesired crosstalk can render such LiDAR systems blind, and therefore useless at scales desired for applications like autonomous driving.

BRIEF SUMMARY

The present disclosure includes, without limitation, the following example implementations.

Some example implementations provide a light detection and ranging (LiDAR) system comprising a first optical source and a second optical source configured to emit respectively a first optical beam and a second optical beam that are nondegenerate and are chirped antiphase; a first tap and a second tap configured to split respectively the first optical beam and the second optical beam into a first high-power path optical beam and a first low-power path optical beam, and a second high-power path optical beam and a second low-power path optical beam; an optical frequency multiplexer configured to combine the first high-power path optical beam and the second high-power path optical beam into a single spatial mode optical beam; lensing optics configured to launch the single spatial mode optical beam towards a target, and collect light incident upon the target into a return path, the light being collected into a return optical beam; an optical frequency demultiplexer configured to split the return optical beam into a first spatial mode optical beam and a second spatial mode optical beam; a first mixer configured to mix the first spatial mode optical beam and the first low-power path optical beam to produce an optical beam having a first beat frequency, and a second mixer configured to mix the second spatial mode optical beam and the second low-power path optical beam to produce an optical beam having a second beat frequency; and a first optical detector and a second optical detector configured to detect respectively the optical beam having the first beat frequency and the optical beam having the second beat frequency, a range and velocity of the target being determinable from the first beat frequency and the second beat frequency.

In some example implementations of the LiDAR system of any preceding example implementation, or any combination of preceding example implementations, the first optical detector and the second optical detector are each a balanced optical detector.

In some example implementations of the LiDAR system of any preceding example implementation, or any combination of preceding example implementations, the LiDAR system further comprises an optical amplifier between the optical frequency multiplexer and lensing optics, the optical amplifier configured to amplify the single spatial mode optical beam.

In some example implementations of the LiDAR system of any preceding example implementation, or any combination of preceding example implementations, the LiDAR system further comprises at least one optical device configured to route the single spatial mode optical beam from the optical frequency multiplexer to the lensing optics, and route the return optical beam from the lensing optics to the optical frequency demultiplexer.

Some example implementations provide a LiDAR system comprising a first optical source and a second optical source configured to emit respectively a first optical beam and a second optical beam that are nondegenerate and are chirped antiphase; an optical frequency multiplexer configured to combine the first optical beam and the second optical beam into a single spatial mode optical beam; at least one tap configured to split the single spatial mode optical beam into a high-power path optical beam and a low-power path optical beam; and at least one optical arrangement comprising: lensing optics configured to launch the high-power path optical beam towards a target, and collect light incident upon the target into a return path, the light being collected into a return optical beam; a mixer configured to mix the return optical beam and the low-power path optical beam, and thereby produce a mixed optical beam; an optical frequency demultiplexer configured to split the mixed optical beam into an optical beam having a first beat frequency, and an optical beam having a second beat frequency; and a first optical detector and a second optical detector configured to detect respectively the optical beam having the first beat frequency and the optical beam having the second beat frequency, a range and velocity of the target being determinable from the first beat frequency and the second beat frequency.

In some example implementations of the LiDAR system of any preceding example implementation, or any combination of preceding example implementations, the first optical detector and the second optical detector are each a balanced optical detector.

In some example implementations of the LiDAR system of any preceding example implementation, or any combination of preceding example implementations, the LiDAR system further comprises an optical amplifier between the at least one tap and lensing optics, the optical amplifier configured to amplify the high-power path optical beam.

In some example implementations of the LiDAR system of any preceding example implementation, or any combination of preceding example implementations, the optical arrangement further comprises at least one optical device configured to route the high-power path optical beam from the at least one tap to the lensing optics, and route the return optical beam from the lensing optics to the mixer.

In some example implementations of the LiDAR system of any preceding example implementation, or any combination of preceding example implementations, the lensing optics include distinct first lensing optics and second lensing optics configured to respectively launch the high-power path optical beam towards the target, and collect the light incident upon the target into the return path, the light being collected into the return optical beam.

In some example implementations of the LiDAR system of any preceding example implementation, or any combination of preceding example implementations, the optical arrangement further comprises a first optical device configured to route the high-power path optical beam from the at least one tap to the first lensing optics, and a second optical device configured to route the return optical beam from the second lensing optics to the mixer.

In some example implementations of the LiDAR system of any preceding example implementation, or any combination of preceding example implementations, the LiDAR system further comprises optical splitters between the at least one tap and the at least one optical arrangement, the optical splitters configured to split the high-power path optical beam and the low-power path optical beam into multiple respective high-power path and low-power path optical beams, wherein the at least one optical arrangement includes multiple optical arrangements for multiple targets, each of the multiple optical arrangements configured to receive respective high-power path and low-power path optical beams, and detect respective optical beams having respective first and second beat frequencies from which the range and velocity of a respective target of the multiple targets is determinable.

In some example implementations of the LiDAR system of any preceding example implementation, or any combination of preceding example implementations, the LiDAR system further comprises an optical amplifier between the at least one tap and one of the optical splitters, the optical amplifier configured to amplify the high-power path optical beam.

In some example implementations of the LiDAR system of any preceding example implementation, or any combination of preceding example implementations, each of the multiple optical arrangements further comprises at least one optical device configured to route the high-power path optical beam from the at least one tap to the lensing optics, and route the return optical beam from the lensing optics to the mixer.

In some example implementations of the LiDAR system of any preceding example implementation, or any combination of preceding example implementations, the LiDAR system further comprises an optical splitter between optical frequency multiplexer and the at least one tap, the optical splitter configured to split the single spatial mode optical beam into multiple single spatial mode optical beams, wherein the at least one tap includes multiple taps configured to split a respective single spatial mode optical beam of the multiple single spatial mode optical beams into respective high-power path and low-power path optical beams, and wherein the at least one optical arrangement includes multiple optical arrangements for multiple targets, each of the multiple optical arrangements configured to receive respective high-power path and low-power path optical beams, and detect respective optical beams having respective first and second beat frequencies from which the range and velocity of a respective target of the multiple targets is determinable.

In some example implementations of the LiDAR system of any preceding example implementation, or any combination of preceding example implementations, the LiDAR system further comprises an optical amplifier between each of the multiple taps and lensing optics, the optical amplifier configured to amplify the high-power path optical beam.

In some example implementations of the LiDAR system of any preceding example implementation, or any combination of preceding example implementations, each of the multiple optical arrangements further comprises at least one optical device configured to route the high-power path optical beam from one of the multiple taps to the lensing optics, and route the return optical beam from the lensing optics to the mixer.

In some example implementations of the LiDAR system of any preceding example implementation, or any combination of preceding example implementations, the LiDAR system further comprises a first tap between the optical frequency multiplexer and the at least one tap, the first tap configured to split the single spatial mode optical beam into multiple single spatial mode optical beams, each of the at least one optical arrangement configured to receive a respective single spatial mode optical beam of the multiple single spatial mode optical beams; and a local reference interferometer configured to receive another respective single spatial mode optical beam of the multiple single spatial mode optical beams, the local reference interferometer including: an optical splitter configured to split the other respective single spatial mode optical beam into a first part optical beam and a second part optical beam for propagation along respectively a first path and a second path, the first path having a propagation medium to give the first path a greater length than the second path; an optical combiner configured to combine the first part optical beam and the second part optical beam from the first path and the second path into a reference optical beam; an optical frequency demultiplexer configured to split the reference optical beam into a first reference optical beam and a second reference optical beam.

In some example implementations of the LiDAR system of any preceding example implementation, or any combination of preceding example implementations, the LiDAR system further comprises an optical amplifier between the at least one tap and lensing optics, the optical amplifier configured to amplify the high-power path optical beam.

In some example implementations of the LiDAR system of any preceding example implementation, or any combination of preceding example implementations, the optical arrangement further comprises at least one optical device configured to route the high-power path optical beam from the tap to the lensing optics, and route the return optical beam from the lensing optics to the mixer.

Some example implementations provide a method of light detection and ranging, the method comprising: emitting respectively a first optical beam and a second optical beam that are nondegenerate and are chirped antiphase; combining the first optical beam and the second optical beam into a single spatial mode optical beam; splitting the single spatial mode optical beam into a high-power path optical beam and a low-power path optical beam; launching the high-power path optical beam towards a target, and collecting light incident upon the target into a return path, the light being collected into a return optical beam; mixing the return optical beam and the low-power path optical beam, and thereby producing a mixed optical beam; splitting the mixed optical beam into an optical beam having a first beat frequency, and an optical beam having a second beat frequency; and detecting respectively the optical beam having the first beat frequency and the optical beam having the second beat frequency, a range and velocity of the target being determinable from the first beat frequency and the second beat frequency.

In some example implementations of the method of any preceding example implementation, or any combination of preceding example implementations, the method comprises at least one tap splitting the single spatial mode optical beam into the high-power path optical beam and the low-power path optical beam, lensing optics launching the high-power path optical beam and collecting the light into the return optical beam, and a mixer mixing the return optical beam and the low-power path optical beam, and wherein the method further comprises at least one optical device routing the high-power path optical beam from at least one tap to the lensing optics, and routing the return optical beam from the lensing optics to the mixer.

In some example implementations of the method of any preceding example implementation, or any combination of preceding example implementations, the method comprises at least one tap splitting the single spatial mode optical beam into the high-power path optical beam and the low-power path optical beam, distinct first lensing optics and second lensing optics respectively launching the high-power path optical beam and collecting the light into the return optical beam, and a mixer mixing the return optical beam and the low-power path optical beam, and wherein the method further comprises a first optical device routing the high-power path optical beam from the at least one tap to the first lensing optics, and a second optical device routing the return optical beam from the second lensing optics to the mixer.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Example implementations of the present disclosure are based on a different type of LiDAR that uses frequency modulation (FM) and coherent detection to overcome the shortcomings of traditional LiDAR systems and the limitations of prior FM LiDAR systems. Historically, FM LiDAR systems suffer from significant losses in the beam's return path; thus, such systems, which are often quite bulky, require a higher beam output power to measure distances comparable to TOF LiDAR systems. Alas, the range is limited by the operating distance for eye-safe output powers.

The present disclosure proposes a method to measure the range and velocity simultaneously, a process that requires coherent detection and has the added benefit of immunity to crosstalk from other LiDAR systems. Also, this method minimizes optical losses in the beam's return path, thereby increasing the system's measurement range. Additionally, by using nondegenerate optical sources, the proposed design can leverage mature wavelength division multiplexing (WDM) techniques often used in integrated silicon photonics, a desired platform due to its compactness and relative stability in varying environmental conditions. Finally, the methods described in the present disclosure allow for fewer polarization discrimination components, which are currently more elusive in integrated silicon photonics platforms; this can reduce the number of input and output facets that are additional sources of optical loss and back reflection, two of the main problems that limit the performance of an FM LiDAR system.

Moreover, the present disclosure allows for the detection and estimation of different material properties depending on its reflectivity/absorption at different wavelengths.

As introduced above, example implementations of the present disclosure are directed to a LiDAR system that uses nondegenerate optical sources and is able to simultaneously measure range and velocity. The non-degeneracy of the sources enables the use of components that mitigate optical loss, thereby making this design a compact, mass-manufacturable, and power efficient LiDAR system with greater and more accurate awareness of its environment. Example implementations have application in a number of different contexts, including in sensing contexts such as those in transportation, manufacturing, metrology, medical, security, and the like. For example, in the automotive industry, such a device can assist with spatial awareness for automated driver assist systems, or self-driving vehicles. Additionally, it can help with velocity calibration of a moving vehicle without the need for a separate inertial movement unit (IMU).

Figure 1:
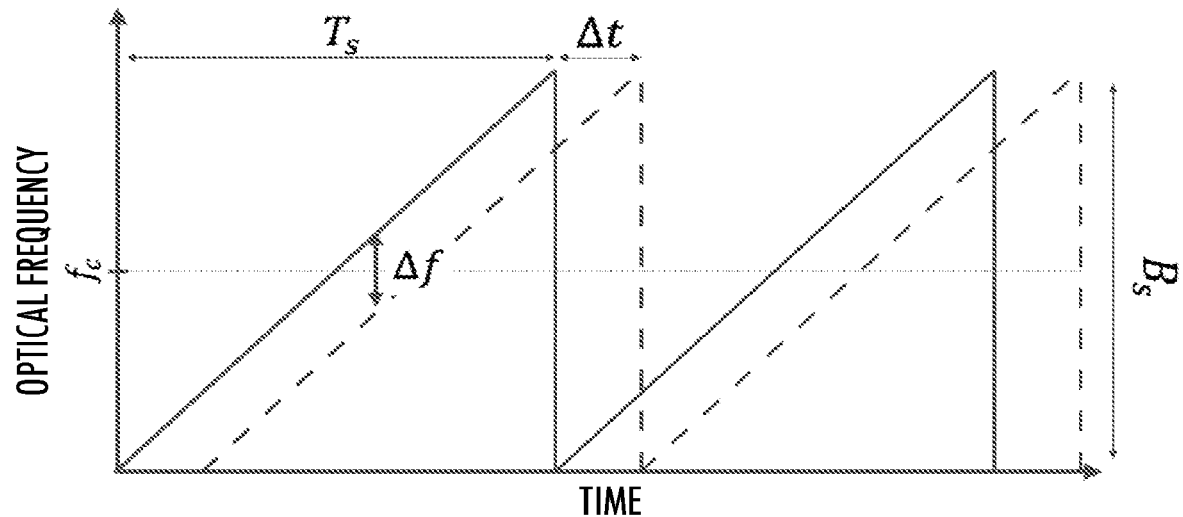
FIGS. 1, 2 and 3 illustrate respectively sawtooth, triangle and counter-chirp modulation schemes for FM LiDAR, according to example implementations of the present disclosure.

FM LiDAR systems, such as that described in this disclosure, keep the power of the optical beam constant while modulating the frequency of the optical beam. FIG. 1 shows an example of a sawtooth modulation waveform wherein the optical source's frequency (inversely related to the wavelength) is periodically swept between a low value and a high value about a central frequency, $f_c$. Such frequency sweeps are called "chirps." The span between the lower and higher frequencies is our sweep bandwidth, $B_S$; this is sometimes referred to as the "frequency excursion" or more concisely "excursion." The sweep time, $T_S$, is also the period of the sawtooth modulation waveform. The delay between the transmitted waveform (solid line) and the return waveform (dashed line), also called the "echo," is $\Delta t$. The phase difference between these two waveforms yields a beat frequency, $\Delta f$.

One can calculate the range, R, to a target, or velocity, V, of said target with the following equations:

$$R = \Delta f_{Range} \frac{cT_S}{2B_S} \quad (1)$$

$$V = \Delta f_{Doppler} \frac{\lambda_c}{2} \quad (2)$$

where $\lambda_c = c/f_c$, and the total beat frequency, $\Delta f$, is the sum of the range and Doppler beat frequencies, corresponding to stationary and moving objects, respectively.

Figure 2:
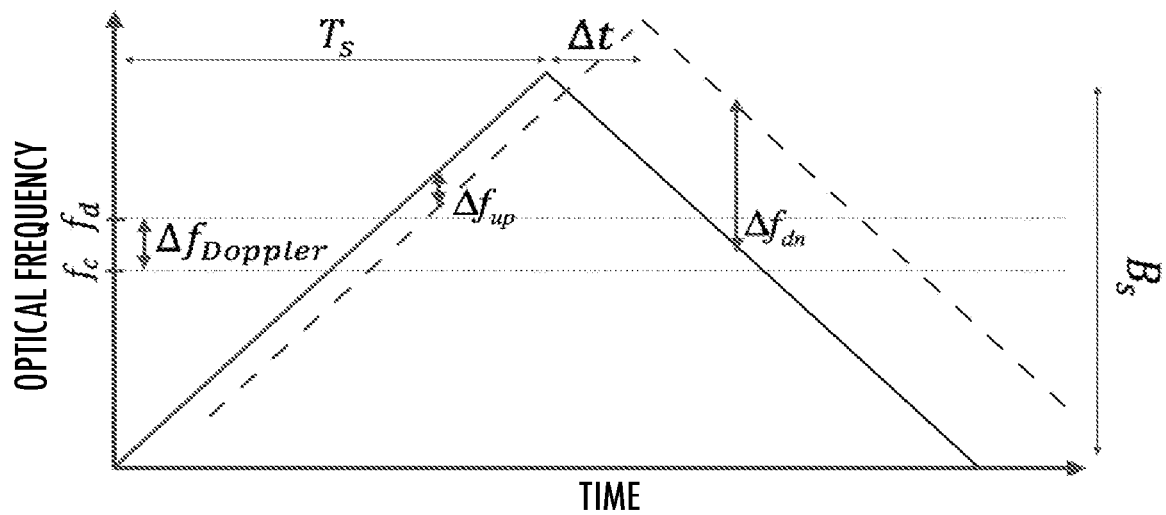

The primary difficulty with the aforementioned sawtooth modulation scheme is differentiating between the range and Doppler beat frequencies. In order to resolve this challenge, one can apply a triangle modulation waveform to the input optical source, as shown in FIG. 2. This scheme has upsweep and down-sweep regions. When detecting a moving object, the Doppler effect shifts the center frequency from $f_c$ to $f_d = f_c + \Delta f_{Doppler}$. The Doppler shift enables us to calculate the up-sweep and down-sweep beat frequencies using:

$$\Delta f_{up} = \Delta f_{Range} - \Delta f_{Doppler} \quad (3)$$

$$\Delta f_{dn} = \Delta f_{Range} + \Delta f_{Doppler} \quad (4)$$

By solving this system of equations for $\Delta f_{Range}$ and $\Delta f_{Doppler}$ and substituting those values into equations (1) and (2) respectively, one sees that the range and velocity, shown in equations (5) and (6), are proportional to the average and difference, respectively, of the up-sweep and down-sweep beat frequencies.

$$R = \frac{cT_S}{4B_S}(\Delta f_{dn} + \Delta f_{up}) \quad (5)$$

$$V = \frac{\lambda_c}{4}(\Delta f_{dn} - \Delta f_{up}) \quad (6)$$

This triangle modulation scheme makes the assumption that the velocity is constant over twice the period of the waveform. In a dynamic environment, this condition may not hold yielding inaccurate measurements.

Figure 3:
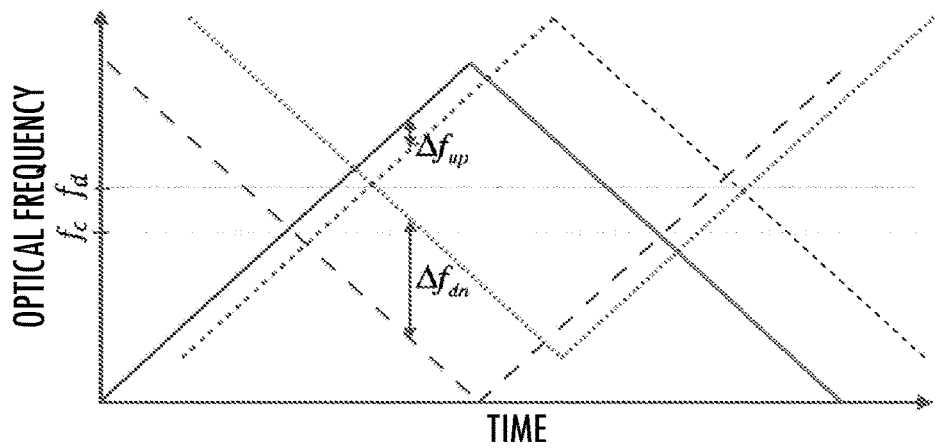

By employing a counter-chirp mechanism, shown in FIG. 3, one can achieve more accurate measurements for range and velocity since the up-sweep and down-sweep beat frequencies are measured simultaneously. This modulation scheme requires two transmitted beams (solid line and long-dashed line) pointed at the same target; each beam yields its respective echo (short-dashed line and dotted line). As a result, the system simultaneously measures both beat notes ($\Delta f_{up}$ and $\Delta f_{dn}$) from which it can calculate the range and velocity using equations (5) and (6).

Figure 4:
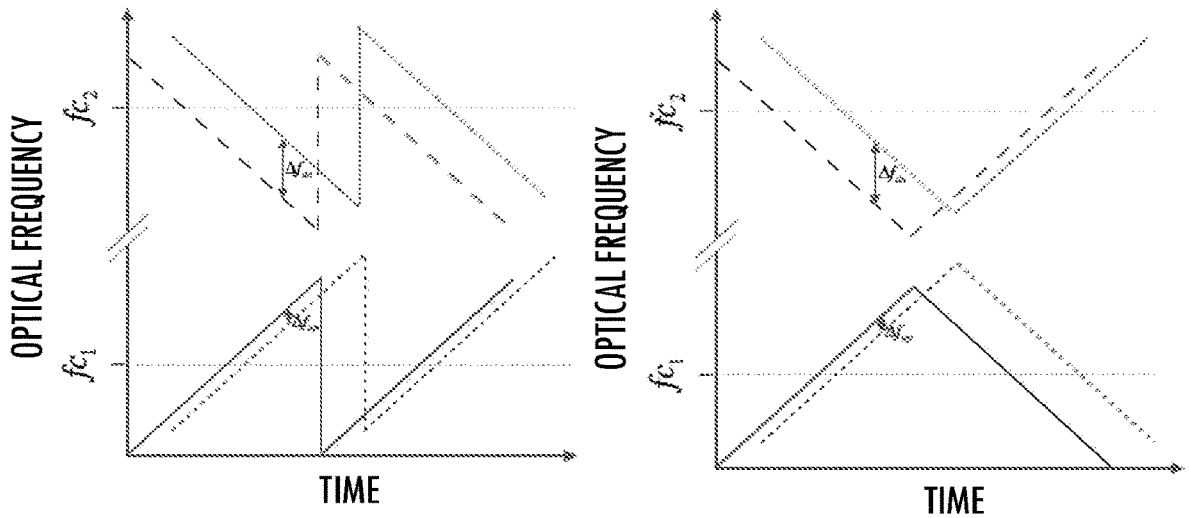
FIG. 4 illustrates a counter-chirp modulation scheme with different carrier frequencies, according to example implementations.

Another example modulation scheme according to the present disclosure is to have a counter chirp scheme but with a different center frequency as shown in FIG. 4. Having such scheme allows us to measure the reflectivity/absorption of different material surfaces.

Shown in the remainder of this disclosure are methods to construct a system capable of achieving long range 4D measurements using the counter-chirp modulation or similar schemes.

Figure 5:
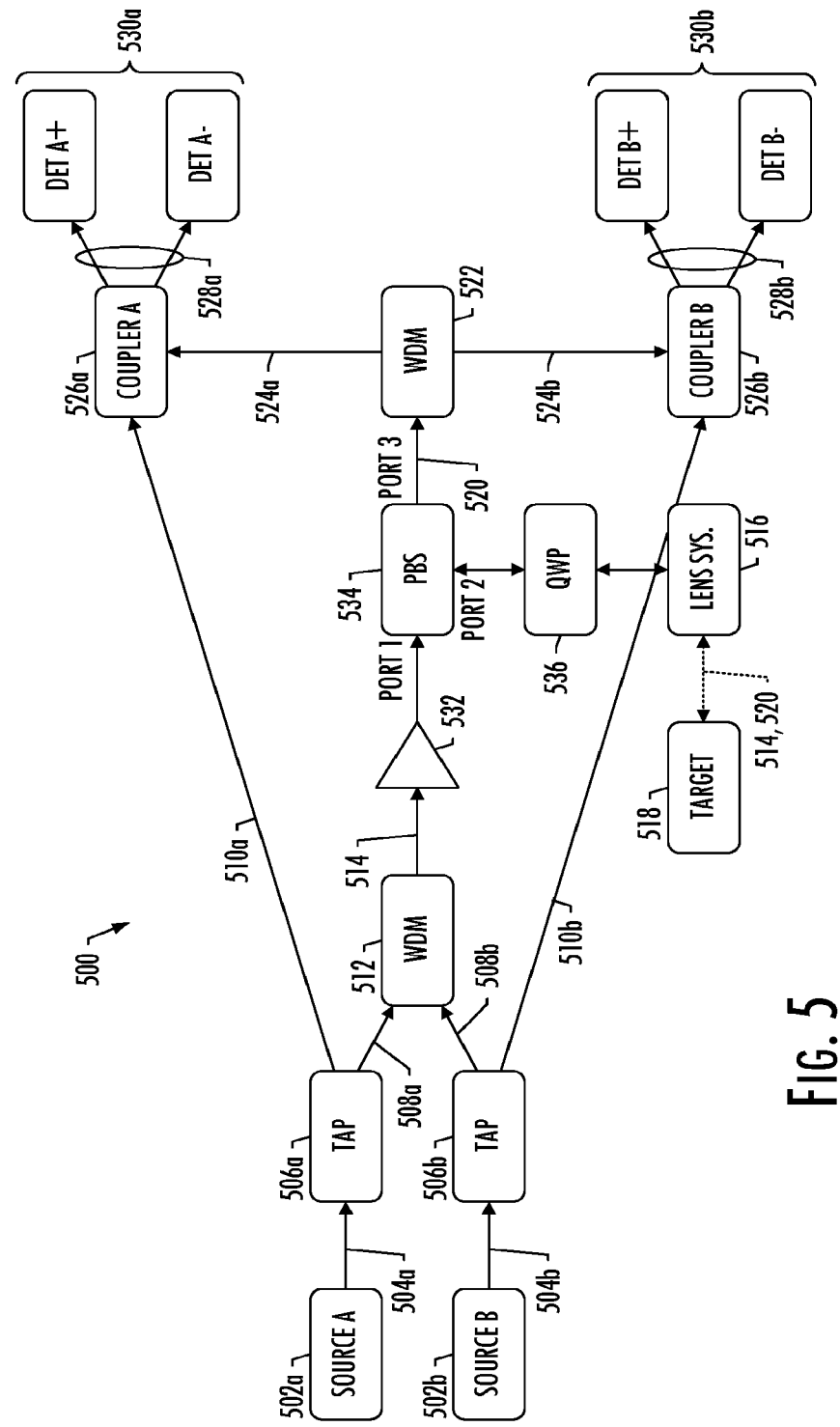
FIGS. 5 and 6 illustrate example implementations of a nondegenerate four-dimensional (4D) FM LiDAR system, according to example implementations.

FIG. 5 shows the first such implementation wherein two nondegenerate optical beams (Source A and Source B) are launched into the optical circuit. Suitable examples of optical sources include laser sources, light-emitting diodes (LEDs) and the like. One can mount these optical sources on the same sub-mount or on separate one, and then tune each optical beam with a triangle wave. In order to achieve the counter-chirp modulation, shown in FIG. 3, one should sweep the two optical beams exactly out of phase, such that an upsweep for Source A is co-temporal with the downsweep of Source B and vice versa. In some examples, more than two optical beams are used. The two or more optical beams may be from the same or separate and distinct optical sources.

A subsequent tap splits each beam into a high-power path and a low-power path. For each optical beam, the latter becomes the optical local oscillator (LO) signal that generates the beat frequency when it is mixed with the return signal on the respective splitter/combiner (labeled coupler A and coupler B in FIG. 5).

An optical frequency multiplexer (labeled as WDM) combines the high-power paths from both optical beams into a single spatial mode. The multiplexer can be of many types and designs including, but not limited to, arrayed waveguides, dense or coarse wavelength division multiplexers, optical add-drop multiplexers, and fiber Bragg gratings. Similarly, the output spatial mode can be in free space, various types of optical fiber, or more exotic waveguides. Any suitable optical amplifier, such as an xDFA, SOA, or booster amplifies the high-power beam thereby increasing the signal-to-noise (SNR) ratio at the output. Note that xDFA refers to any doped fiber amplifiers for use with the appropriate wavelength optical source, e.g., an erbium-doped fiber amplifier (EDFA) is necessary for a 1550-nm source. The amplifier output routes to one or more optical devices such as a polarizing beamsplitter (PBS), followed by a polarization wave plate such as a quarter-wave plate (QWP), and lensing optics which launch the output of Port 2 into free space towards the target. Other examples of optical devices suitable to route the amplifier output to the lensing optics include an optical circulator, optical splitter/combiner or the like.

The same lensing optics and optical device(s) (e.g., QWP) collect the emitted light that was incident upon a target into the return path. Since the PBS linearizes the polarization of the outgoing light, the collected light in the return path is the opposite linear polarization, and thus output at Port 3. A frequency demultiplexer, of any suitable mechanism or design, splits the light into two separate spatial modes. Each demultiplexed signal mixes with its respective LO signal at the coupler to generate the detected beat frequency. Note that FIG. 5 shows balanced detection in an effort to not discard any optical power at the output of the mixer, although single channel detection can also work.

More specifically, then, FIG. 5 illustrates a LiDAR system 500 according to example implementations of the present disclosure. As shown, the LiDAR system includes at least a first optical source 502a and a second optical source 502b (e.g., laser sources, LEDs) configured to emit respectively a first optical beam 504a and a second optical beam 504b that are nondegenerate and are chirped antiphase. The LiDAR system includes a first tap 506a and a second tap 506b configured to split respectively the first optical beam and the second optical beam into a first high-power path optical beam 508a and a first low-power path optical beam 510a, and a second high-power path optical beam 508b and a second low-power path optical beam 510b.

The LiDAR system 500 includes an optical frequency multiplexer 512 configured to combine the first high-power path optical beam 508a and the second high-power path optical beam 508b into a single spatial mode optical beam 514. The LiDAR system includes lensing optics 516 configured to launch the single spatial mode optical beam towards a target 518, and collect light incident upon the target into a return path, the light being collected into a return optical beam 520. The LiDAR system includes an optical frequency demultiplexer 522 configured to split the return optical beam into a first spatial mode optical beam 524a and a second spatial mode optical beam 524b.

As also shown, the LiDAR system 500 includes a first mixer 526a configured to mix the first spatial mode optical beam 524a and the first low-power path optical beam 510a to produce an optical beam 528a having a first beat frequency, and a second mixer 526b configured to mix the second spatial mode optical beam 524b and the second low-power path optical beam 510b to produce an optical beam 528b having a second beat frequency. The LiDAR system includes a first optical detector 530a and a second optical detector 530b configured to detect respectively the optical beam 528a having the first beat frequency and the optical beam 528b having the second beat frequency. In some examples, the first optical detector and the second optical detector are each a balanced optical detector. As explained above, the range and velocity of the target are determinable from the first beat frequency and the second beat frequency.

In some examples, The LiDAR system 500 further include an optical amplifier 532 between the optical frequency multiplexer 512 and lensing optics 516, the optical amplifier configured to amplify the single spatial mode optical beam 514. And in some examples, the LiDAR system further includes at least one optical device configured to route the single spatial mode optical beam 514 from the optical frequency multiplexer 512 to the lensing optics 516, and route the return optical beam 520 from the lensing optics to the optical frequency demultiplexer 522. As shown, the optical device(s) include a polarizing beamsplitter 534 and polarization wave plate 536. Other examples of suitable optical device(s) include an optical circulator or an optical splitter/combiner.

As mentioned earlier, the amplifier increases the SNR at the output. It also increases the potential range of the system. However, the amplifier also can create a strong back-reflection signal from the end of the fiber-air or waveguide-air facet. Such a strong signal would increase the noise floor thereby reducing the SNR. Fortunately, the back-reflected signal is co-polarized with the outgoing signal, so the PBS essentially filters out the undesired signal by passing it back through Port 1. Moreover, if any of the undesired signal leaks through the PBS into Port 3, the detected beat note from that signal should be reduced due to a mismatch with the mixing LO polarization.

Another variation of this design is to replace the PBS with an optical circulator or an optical splitter/combiner. In that concept there is no need for a QWP.

The prior design, albeit sufficient, can suffer from back-reflection related problems arising from any intermediate component between the LO tap and the LO mixer, through either the low-power or high-power paths. Hence, an alternate implementation, shown in FIG. 6, reduces the noise and removes additional beat frequencies that are generated by the back-reflections from such components. It achieves this by moving the first WDM before the taps, and the other WDMs after the LO mixer. This design also benefits by having fewer components since only one tap and one mixer are necessary. The reduction in the number of components minimizes the transmission loss through the system, lowers the cost of the design, and simplifies the production steps.

Figure 6:
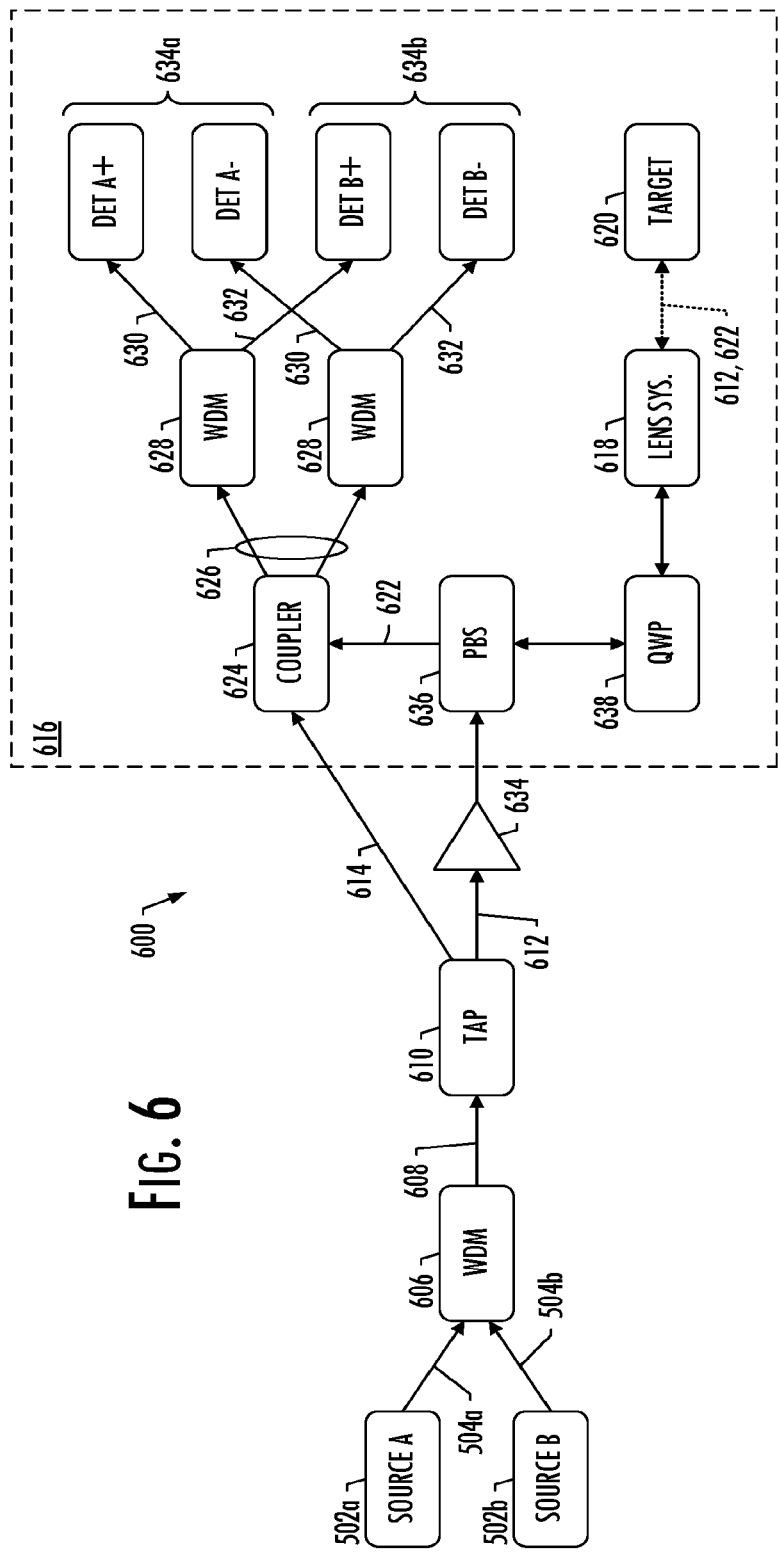

FIG. 6 therefore illustrates a LiDAR system 600 according to other example implementations. Similar to before, the LiDAR system includes first and second optical sources 502a, 502b configured to emit respectively a first optical beam 504a and a second optical beam 504b that are non-degenerate and are chirped antiphase. The LiDAR system includes an optical frequency multiplexer 606 configured to combine the first optical beam and the second optical beam into a single spatial mode optical beam 608. The LiDAR system includes at least one tap 610 configured to split the single spatial mode optical beam into a high-power path optical beam 612 and a low-power path optical beam 614.

As also shown, the LiDAR system 600 includes at least one optical arrangement 616. This optical arrangement includes lensing optics 618 configured to launch the high-power path optical beam 612 towards a target 620, and collect light incident upon the target into a return path, the light being collected into a return optical beam 622. The optical arrangement includes a mixer 624 configured to mix the return optical beam 622 and the low-power path optical beam 614, and thereby produce a mixed optical beam 626.

The optical arrangement 616 also includes an optical frequency demultiplexer 628 configured to split the mixed optical beam into an optical beam 630 having a first beat frequency, and an optical beam 632 having a second beat frequency. And the optical arrangement includes a first optical detector 634a and a second optical detector 634b configured to detect respectively the optical beam 630 having the first beat frequency and the optical beam 632 having the second beat frequency. Similar to before, in some examples, the first optical detector and the second optical detector are each a balanced optical detector. Again, the range and velocity of the target are determinable from the first beat frequency and the second beat frequency.

In some examples, the LiDAR system 600 further includes an optical amplifier 634 between the at least one tap 610 and lensing optics 618, the optical amplifier configured to amplify the high-power path optical beam 612. And in some examples, the optical arrangement 616 further includes at least one optical device configured to route the high-power path optical beam 612 from the at least one tap 610 to the lensing optics 618, and route the return optical beam 622 from the lensing optics to the mixer 624. As shown, the optical device(s) include a polarizing beamsplitter 636 and polarization wave plate 638, but other optical device(s) may also be used such as an optical circulator or an optical splitter/combiner.

Figure 7:
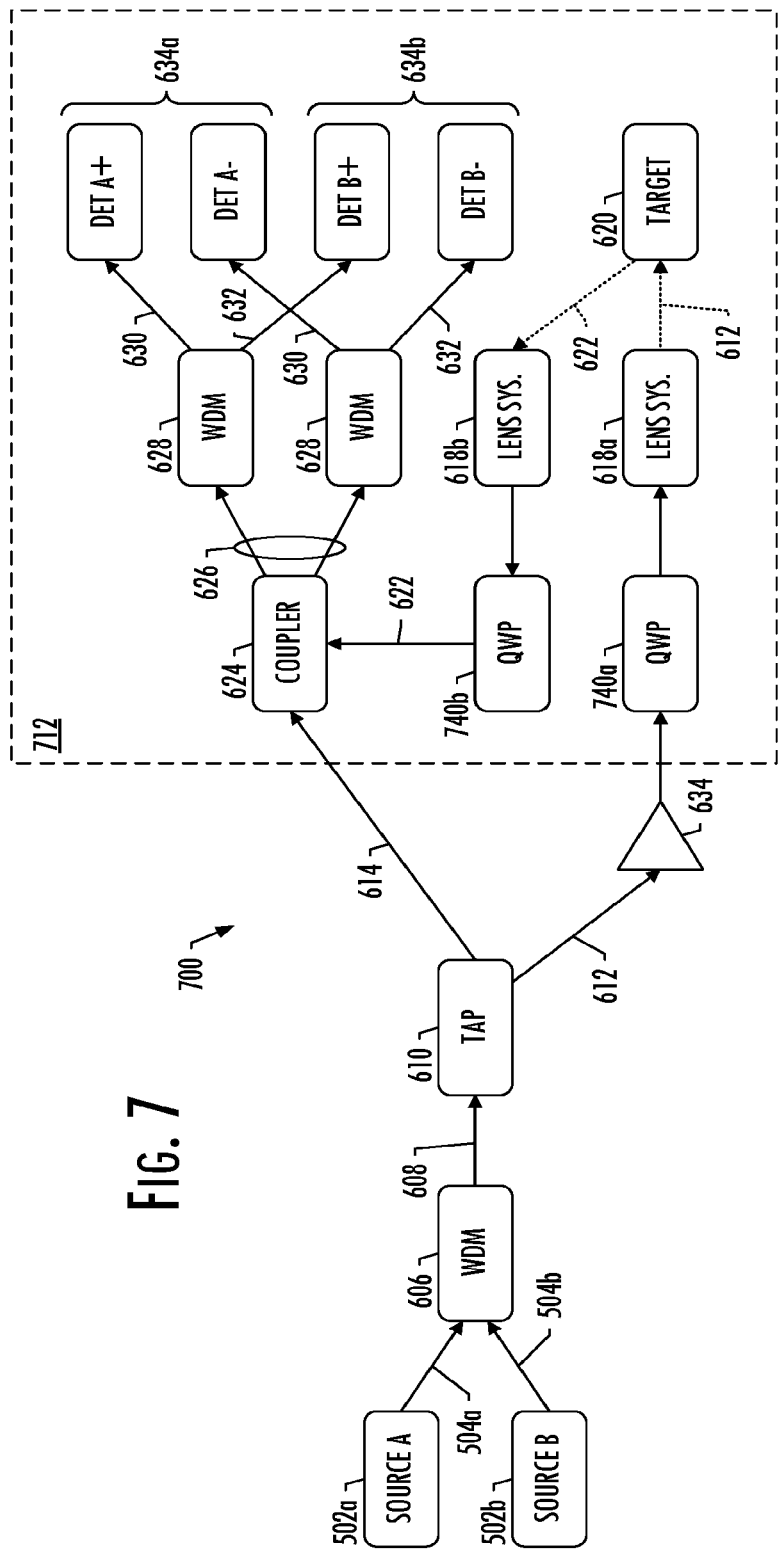
FIG. 7 illustrates a bi-static design of a nondegenerate 4D FM LiDAR system, according to example implementations.

Shown in FIG. 7 is the implementation of a bi-static design for the nondegenerate 4D FM LiDAR system. This implementation decouples the outgoing beam path from the returning collection path. An additional QWP and lens system replaces the PBS from the previous design. This design has the benefit that any potential crosstalk that previously leaked through the PBS is entirely removed. Note that the bi-static design can be employed in any of the prior or following designs at the cost of additional components.

In particular, FIG. 7 illustrates a LiDAR system 700 similar to the LiDAR system 600 of FIG. 6, although with optical arrangement 712 instead of optical arrangement 616. The optical arrangements are similar but in the optical arrangement 712 of FIG. 7, the lensing optics 618 include distinct first lensing optics 618a and second lensing optics 618b configured to respectively launch the high-power path optical beam 612 towards the target, and collect the light incident upon the target into the return path, the light being collected into the return optical beam 622. In some examples, the optical arrangement 712 further includes a first optical device (e.g., first polarization wave plate 740a) configured to route the high-power path optical beam 612 from the at least one tap 610 to the first lensing optics 618a, and a second optical device (e.g., second polarization wave plate 740b) configured to route the return optical beam 622 from the second lensing optics 618b to the mixer 624.

Figure 8:
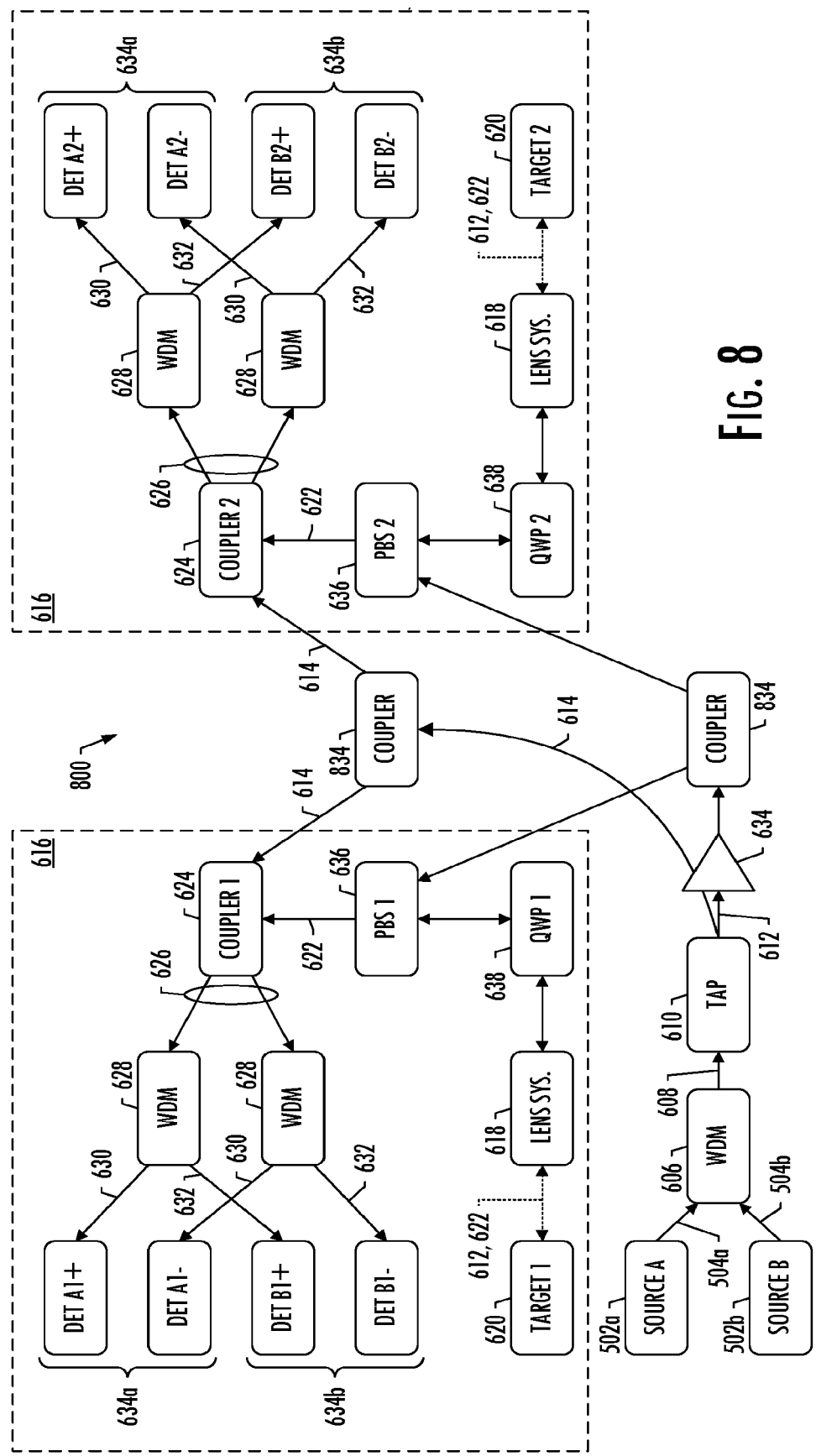
FIG. 8 illustrates a two-beam implementation for a nondegenerate 4D FM LiDAR system optimized for system size, according to example implementations.
Figure 9:
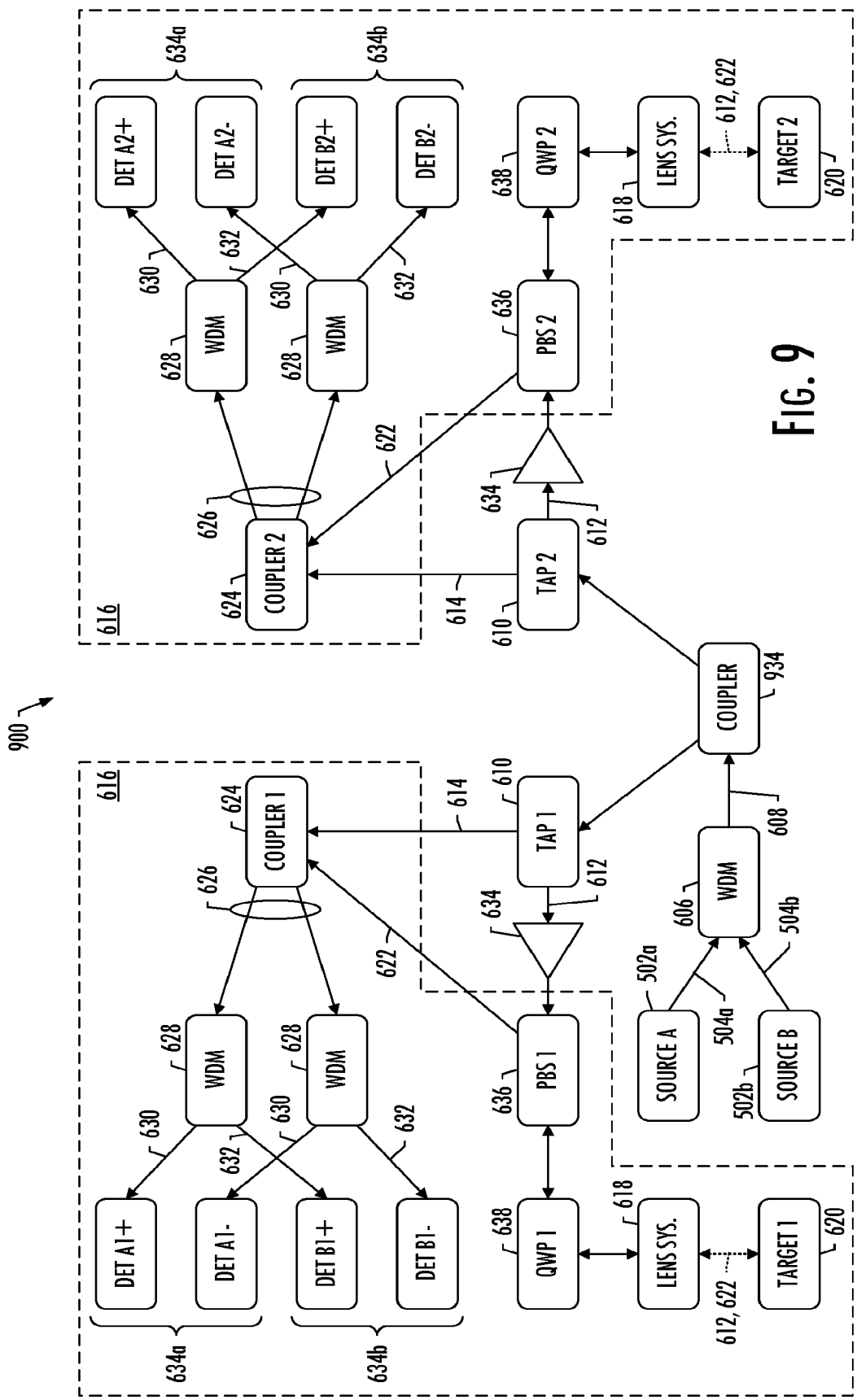
FIG. 9 illustrates two-beam implementation for a nondegenerate 4D FM LiDAR system optimized for minimal back-reflections and maximal signal-to-noise ratio, according to example implementations.

An additional method to improve the versatility and usefulness of such a 4D LiDAR system is to illuminate one's surroundings using multiple beams. One way to achieve this is by building many separate systems and synthesizing their data streams. Alas, such a design is cost and resource inefficient from a hardware perspective since every system requires its own optical sources and amplifiers. FIGS. 8 and 9 both show schematics of implementations that use two outgoing beams in an effort to pool resources. The addition of a couple splitters generates the two separate beam paths and LiDAR collection systems. Employing similar strategies using splitters with more outputs can increase the number of beams. FIG. 8 shows a design that optimizes for number of components including one fewer amplifier. The design shown in FIG. 9 optimizes for back-reflections that may reduce the SNR for each individual beam path. Note that for short ranges, one can remove the amplifiers from these designs entirely. In this manner, one can combine a short-range system with a long-range system for various applications including wider environmental field-of-view, velocity calibration, or more precise local resolution for positional awareness. Essentially, this implementation has the benefits of having multiple 4D LiDAR systems with various parameters, while reducing the size and cost of such a system by combining resources wherever possible.

FIGS. 8 and 9 in particular illustrate LiDAR systems 800, 900 that similar to the other implementations, includes first and second optical sources 502a, 502b configured to emit respectively a first optical beam 504a and a second optical beam 504b that are nondegenerate and are chirped antiphase. The LiDAR system includes an optical frequency multiplexer 606 configured to combine the first optical beam and the second optical beam into a single spatial mode optical beam 608. The LiDAR system includes at least one tap 610 configured to split the single spatial mode optical beam into a high-power path optical beam 612 and a low-power path optical beam 614. And the LiDAR system includes at least one optical arrangement 616.

The LiDAR system 800 in FIG. 8 further includes optical splitters 834 between the at least one tap 610 and the at least one optical arrangement 616. The optical splitters are configured to split the high-power path optical beam 612 and the low-power path optical beam 614 into multiple respective high-power path and low-power path optical beams 612, 614. The optical arrangement 616 includes multiple optical arrangements for multiple targets 620. Each of the multiple optical arrangements is configured to receive respective high-power path and low-power path optical beams, and detect respective optical beams 630, 632 having respective first and second beat frequencies from which the range and velocity of a respective target of the multiple targets is determinable.

In some examples, the LiDAR system 800 further includes an optical amplifier 634 between the at least one tap 610 and one of the optical splitters, shown as optical splitter 834, the optical amplifier configured to amplify the high-power path optical beam 612. And in some examples, similar to earlier described example implementations, each of the multiple optical arrangements 616 further includes at least one optical device (e.g., polarizing beamsplitter 636 and polarization wave plate 638) configured to route the high-power path optical beam 612 from the at least one tap 610 to the lensing optics 618, and route the return optical beam 622 from the lensing optics to the mixer 624.

The LiDAR system 900 in FIG. 9 further includes an optical splitter 934 between optical frequency multiplexer 606 and the at least one tap 610. The optical splitter is configured to split the single spatial mode optical beam 608 into multiple single spatial mode optical beams 608. Also, in this example implementation, the at least one tap includes multiple taps configured to split a respective single spatial mode optical beam 608 of the multiple single spatial mode optical beams into respective high-power path and low-power path optical beams 612, 614.

Similar to LiDAR system 800 in FIG. 8, the LiDAR system 900 in FIG. 9 includes multiple optical arrangements 616 for multiple targets 620. In LiDAR system 900, each of the multiple optical arrangements is configured to receive respective high-power path and low-power path optical beams 612, 614, and detect respective optical beams 630, 632 having respective first and second beat frequencies from which the range and velocity of a respective target of the multiple targets is determinable.

In some examples, The LiDAR system 900 further includes an optical amplifier 634 between each of the multiple taps 610 and lensing optics 618, the optical amplifier configured to amplify the high-power path optical beam 612. And in some examples, each of the multiple optical arrangements 616 further includes at least one optical device (e.g., polarizing beamsplitter 636 and polarization wave plate 638) configured to route the high-power path optical beam 612 from one of the multiple taps 610 to the lensing optics 618, and route the return optical beam 622 from the lensing optics to the mixer 624.

Figure 10:
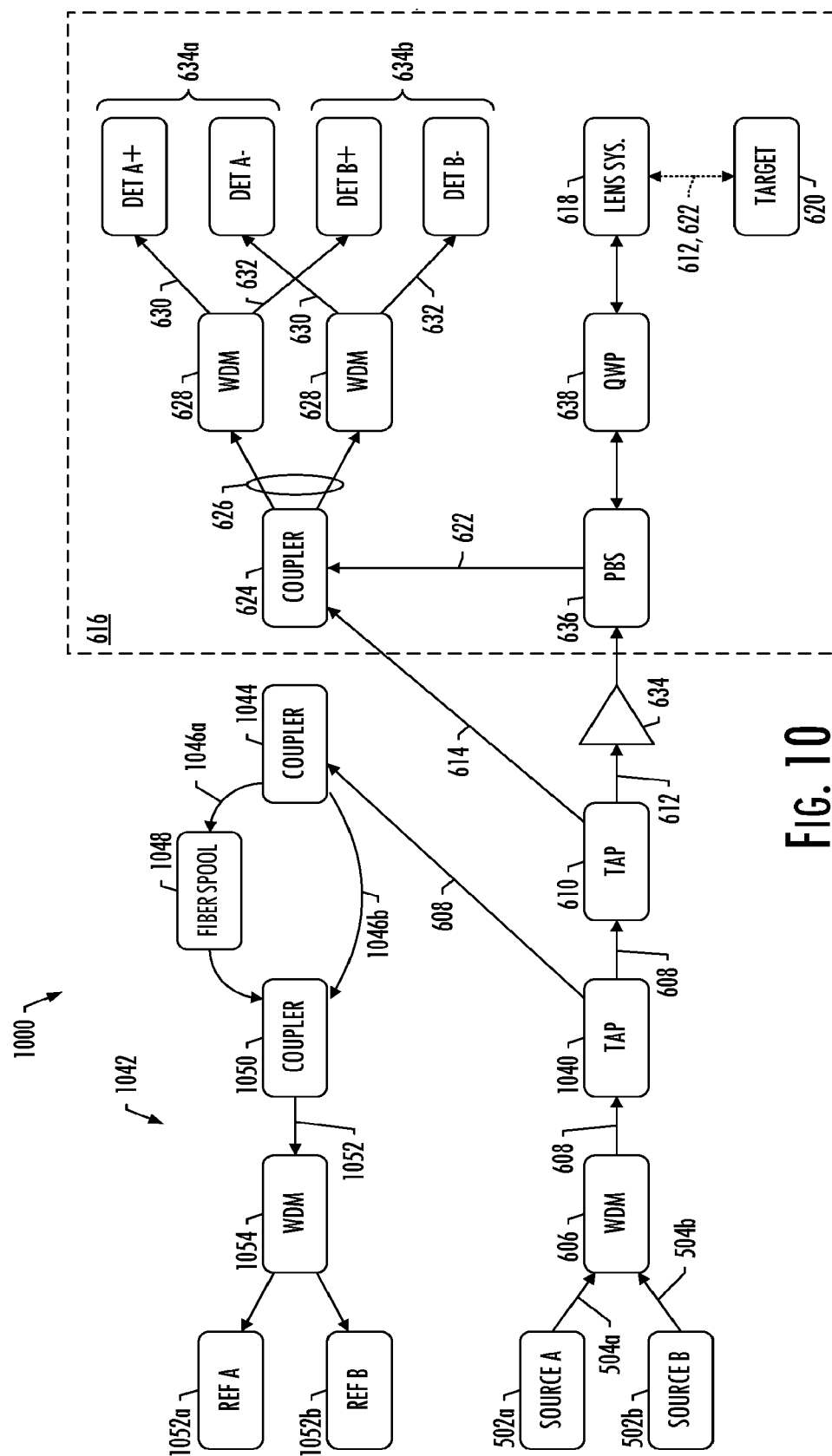
FIG. 10 illustrates a nondegenerate 4D FM LiDAR system with an auxiliary range arm, according to example implementations.

An extension of the two-beam implementation is to have an auxiliary range arm, as shown in FIG. 10. This implementation differs from the two-beam design in that the second beam is not launched toward a target, but rather sent to a local reference interferometer via a tap. The reference interferometer enables the system to compensate for drifts in the optical frequency, ensure a well-tuned modulation waveform, and calibrate the beat frequency to range measurement. Essentially, the auxiliary arm aids the system in correcting for any nonlinear fluctuations to the optical sources. Note that although FIG. 10 shows the auxiliary arm added to the second implementation (FIG. 6), this auxiliary arm can be added to any of the aforementioned implementations. Keeping that in mind, a single auxiliary arm could vastly improve the resource efficiency of a multiple-beam design, like that shown in FIG. 9, since only one auxiliary arm is necessary for all the separate beams.

FIG. 10 in particular illustrates a LiDAR system 1000 according to example implementations of the present disclosure. Again, similar to the other implementations, the LiDAR system 1000 includes first and second optical sources 502a, 502b configured to emit respectively a first optical beam 504a and a second optical beam 504b that are nondegenerate and are chirped antiphase. The LiDAR system includes an optical frequency multiplexer 606 configured to combine the first optical beam and the second optical beam into a single spatial mode optical beam 608. The LiDAR system includes at least one tap 610 configured to split the single spatial mode optical beam into a high-power path optical beam 612 and a low-power path optical beam 614. And the LiDAR system includes at least one optical arrangement 616.

The LiDAR system 1000 in FIG. 10 further includes a first tap 1040 between the optical frequency multiplexer 606 and the at least one tap 610. The first tap is configured to split the single spatial mode optical beam 608 into multiple single spatial mode optical beams 608, and each of the at least one optical arrangement 616 is configured to receive a respective single spatial mode optical beam of the multiple single spatial mode optical beams. In addition, a local reference interferometer 1042 is configured to receive another respective single spatial mode optical beam 608 of the multiple single spatial mode optical beams.

As shown, the local reference interferometer 1042 includes an optical splitter 1044 configured to split the other respective single spatial mode optical beam 608 into a first part optical beam 1046a and a second part optical beam 1046b for propagation along respectively a first path and a second path. The first path has a propagation medium 1048 such as an optical fiber spool to give the first path a greater length than the second path. The local reference interferometer includes an optical combiner 1050 configured to combine the first part optical beam and the second part optical beam from the first path and the second path into a reference optical beam 1052. And an optical frequency demultiplexer 1054 is configured to split the reference optical beam into a first reference optical beam 1052a and a second reference optical beam 1052b.

In some examples, the LiDAR system 1000 further includes an optical amplifier 634 between the at least one tap 610 and lensing optics 618, the optical amplifier configured to amplify the high-power path optical beam 612. And in some examples, similar to other examples, the optical arrangement 616 further includes at least one optical device (e.g., polarizing beamsplitter 636 and polarization wave plate 638) configured to route the high-power path optical beam 612 from the tap 610 to the lensing optics 618, and route the return optical beam 622 from the lensing optics to the mixer 624.

Another variation of the system is to adjust the center wavelength of both optical beams since the performance of these designs is relatively wavelength agnostic. This tuning can provide a different understanding of the target's material by looking at the difference in the return intensity between the two wavelengths with reasonably different absorption or reflection spectra. Again, by employing the multiple beam implementation, once can obtain such characterizations of the local environment immediately.

As remarked briefly earlier, this system can be built in a variety of propagation mediums including optical fibers, crystalline waveguides, or free-space air. This versatility implies that any 2D optical scanning system can be added at the output of any of the implementations mentioned and their extensions or combinations to provide a true, complete 4D map of the sensor's surrounding environment.

Figure 11:
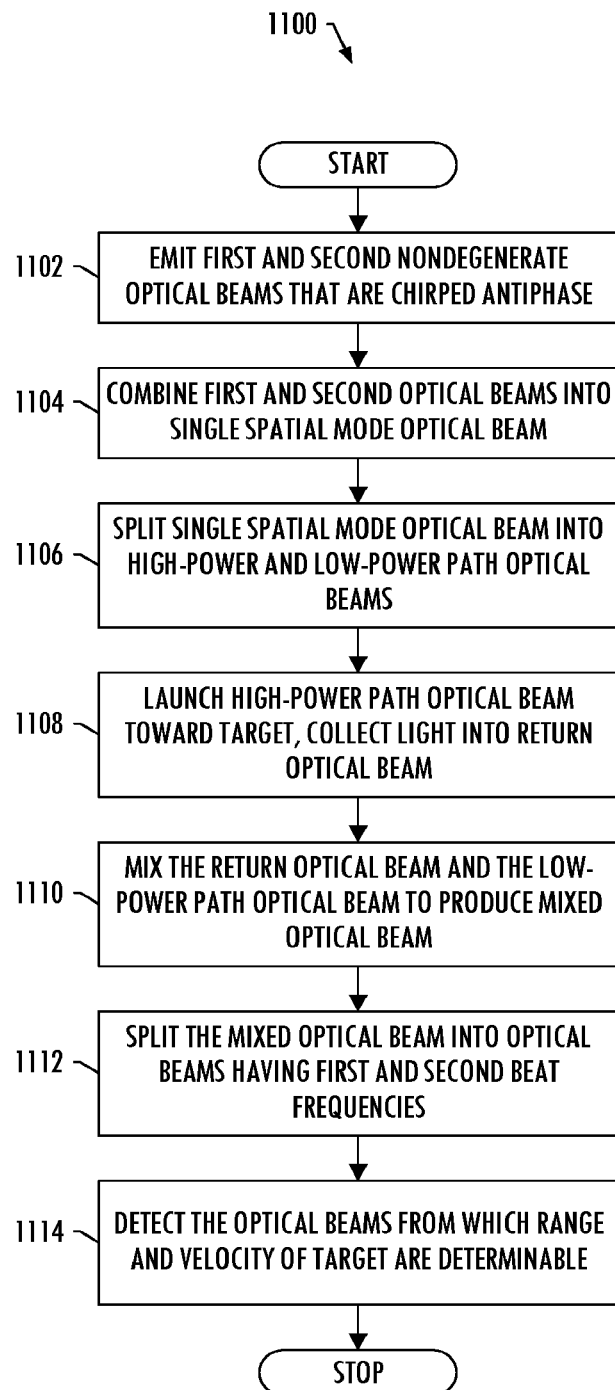
FIG. 11 illustrates a flowchart with various steps in a method of light detection and ranging, according to some example implementations.

FIG. 11 illustrates a flowchart with various steps in a method 1100 of light detection and ranging, according to some example implementations of the present disclosure. As shown at blocks 1102 and 1104, the method includes emitting respectively a first optical beam and a second optical beam that are nondegenerate and are chirped antiphase, and combining the first optical beam and the second optical beam into a single spatial mode optical beam. The method includes splitting the single spatial mode optical beam into a high-power path optical beam and a low-power path optical beam, as shown at block 1106.

The method 1100 includes launching the high-power path optical beam towards a target, and collecting light incident upon the target into a return path, the light being collected into a return optical beam, as shown at block 1108. The method includes mixing the return optical beam and the low-power path optical beam, and thereby producing a mixed optical beam, as shown at block 1110. The method includes splitting the mixed optical beam into an optical beam having a first beat frequency, and an optical beam having a second beat frequency, as shown at block 1112. And the method includes detecting respectively the optical beam having the first beat frequency and the optical beam having the second beat frequency, a range and velocity of the target being determinable from the first beat frequency and the second beat frequency, as shown at block 1114. And in some examples, the method may further include determining the range and velocity of the target from the first beat frequency and the second beat frequency.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system comprising:
   a first optical source and a second optical source configured to emit respectively a first optical beam and a second optical beam that are nondegenerate and are chirped antiphase;
   at least one tap configured to split each of the first optical beam and the second optical beam to generate a first local oscillator and a second local oscillator;
   lensing optics to direct the first and second optical beams toward a target, and collect reflected light from the first optical beam and second optical beam incident upon the target into a return path, the reflected light being collected into a return optical beam comprising a first return signal and a second return signal; and
   a first optical detector and a second optical detector configured to detect a first beat frequency generated from by mixing the first return signal with the first local oscillator and a second beat frequency generated from mixing the second return signal with the second local oscillator.

2. The LIDAR system of claim 1, further comprising an optical frequency multiplexer configured to combine the first optical beam and the second optical beam into a single spatial mode optical beam.

3. The LIDAR system of claim 2 further comprising:
   an optical splitter between the optical frequency multiplexer and the at least one tap, the optical splitter configured to split the single spatial mode optical beam into multiple single spatial mode optical beams, and wherein the at least one tap includes multiple taps configured to split a respective single spatial mode optical beam of the multiple single spatial mode optical beams to generate multiple local oscillators.

4. The LIDAR system of claim 2, further comprising an optical frequency demultiplexer to split a received return optical beam into the first return signal corresponding to the first optical beam and the second return signal corresponding to the second optical beam.

5. The LIDAR system of claim 4 further comprising an optical amplifier between the optical frequency multiplexer and lensing optics, the optical amplifier configured to amplify the single spatial mode optical beam.

6. The LIDAR system of claim 4 further comprising at least one optical device configured to route the single spatial mode optical beam from the optical frequency multiplexer to the lensing optics, and route the return optical beam from the lensing optics to the optical frequency demultiplexer.

7. The LIDAR system of claim 1, wherein the lensing optics include distinct first lensing optics and second lensing optics to respectively direct the first optical beam and second optical beam towards the target, and collect a reflection of the first optical beam and second optical beam incident upon the target into the return path, the light being collected into the first return signal and the second return signal.

8. A method of light detection and ranging comprising:
   emitting a first optical beam from a first optical source and a second optical beam from a second optical beam;
   splitting each of the first optical beam and the second optical beam to generate a first local oscillator and a second local oscillator;
   directing the first and second optical beams toward a target;
   collecting a reflected signal of the first optical beam and second optical beam incident upon the target into a return path, the reflected signal being collected into a return optical beam comprising a first return signal and a second return signal; and
   detecting a first beat frequency generated from mixing the first return signal with the first local oscillator and a second beat frequency generated from mixing the return signal with the second local oscillator.

9. The method of claim 8, further comprising:
   combining, via an optical frequency multiplexer, the first optical beam and the second optical beam into a single spatial mode optical beam.

10. The method of claim 9, further comprising:
    splitting the single spatial mode optical beam into multiple single spatial mode optical beams; and
    splitting a respective single spatial mode optical beam of the multiple single spatial mode optical beams to generate multiple local oscillators.

11. The method of claim 9, further comprising:
    sSplitting, by an optical frequency demultiplexor, the return optical beam into the first return signal corresponding to the first optical beam and the second return signal corresponding to the second optical beam.

12. The method of claim 11, further comprising:
    amplifying the single spatial mode optical beam before directing the single mode optical beam toward the target.

13. The method of claim 11, further comprising:
    routing the single spatial mode optical beam from the optical frequency multiplexer to the lensing optics; and
    routing the return optical beam from the lensing optics to the optical frequency demultiplexer.

14. The method of claim 8, further comprising:
respectively directing the first optical beam and second optical beam towards the target via distinct lensing optics, and
collecting a reflection of the first optical beam and second optical beam incident upon the target into the return path, via the distinct lensing optics, the light being collected into the first return signal and the second return signal.

15. A light detection and ranging (LIDAR) apparatus comprising:
a first optical source and a second optical source configured to emit respectively a first optical beam and a second optical beam that are nondegenerate and are chirped antiphase;
at least one tap configured to split each of the first optical beam and the second optical beam to generate a first local oscillator and a second local oscillator;
lensing optics to direct the first and second optical beams toward a target, and collect reflected light from the first optical beam and second optical beam incident upon the target into a return path, the reflected light being collected into a return optical beam comprising a first return signal and a second return signal; and
a first optical detector and a second optical detector configured to detect a first beat frequency generated from by mixing the first return signal with the first local oscillator and a second beat frequency generated from mixing the second return signal with the second local oscillator.

16. The LIDAR apparatus of claim 15, further comprising an optical frequency multiplexer configured to combine the first optical beam and the second optical beam into a single spatial mode optical beam.

17. The LIDAR apparatus of claim 16 further comprising:
an optical splitter between the optical frequency multiplexer and the at least one tap, the optical splitter configured to split the single spatial mode optical beam into multiple single spatial mode optical beams, and
wherein the at least one tap includes multiple taps configured to split a respective single spatial mode optical beam of the multiple single spatial mode optical beams to generate multiple local oscillators.

18. The LIDAR apparatus of claim 16, further comprising an optical frequency demultiplexer to split a received return optical beam into the first return signal corresponding to the first optical beam and the second return signal corresponding to the second optical beam.

19. The LIDAR apparatus of claim 18 further comprising an optical amplifier between the optical frequency multiplexer and lensing optics, the optical amplifier configured to amplify the single spatial mode optical beam.

20. The LIDAR apparatus of claim 18, further comprising at least one optical device configured to route the single spatial mode optical beam from the optical frequency multiplexer to the lensing optics, and route the return optical beam from the lensing optics to the optical frequency demultiplexer.

* * * * *